(12) United States Patent
Anderson et al.

(10) Patent No.: US 7,849,820 B1
(45) Date of Patent: Dec. 14, 2010

(54) MACHINE FOR ALTERNATING CONVEYOR BELT LIVESTOCK LOADING

(76) Inventors: Douglas Dean Anderson, 2109 280th St., Marshall, MN (US) 56258; Joshua Dean Anderson, 2109 280th St., Marshall, MN (US) 56258

( * ) Notice: Subject to any disclaimer, the term of this patent is extended or adjusted under 35 U.S.C. 154(b) by 259 days.

(21) Appl. No.: 12/313,526

(22) Filed: Nov. 21, 2008

(51) Int. Cl.
*A01K 29/00* (2006.01)
(52) U.S. Cl. ...................................... 119/846
(58) Field of Classification Search .......... 119/843–846
See application file for complete search history.

(56) References Cited

U.S. PATENT DOCUMENTS

| | | |
|---|---|---|
| 3,253,577 A | 5/1966 | Lund |
| 3,389,780 A | 6/1968 | Jerome |
| 3,389,960 A | 6/1968 | Jerome |
| 3,420,211 A | 1/1969 | Hartvickson |
| 3,452,718 A | 7/1969 | Wight |
| 3,476,089 A | 11/1969 | Jerome |
| 3,602,198 A | 8/1971 | Tackett |
| 3,702,600 A | 11/1972 | Bright et al. |
| 3,722,477 A | 3/1973 | Weldy et al. |
| 3,958,536 A | 5/1976 | Crowder |
| 4,074,658 A | 2/1978 | Mermelstein et al. |
| 5,325,820 A | 7/1994 | Briggs et al. |
| 5,469,815 A | 11/1995 | Stross |
| 5,743,217 A | 4/1998 | Jerome |
| 5,915,338 A | 6/1999 | Fitzsimmons et al. |
| 6,109,215 A | 8/2000 | Jerome |
| 6,347,604 B1 | 2/2002 | Lapere et al. |
| 6,447,234 B2 | 9/2002 | Sinn et al. |
| 6,454,510 B1 | 9/2002 | Sinn et al. |
| 6,564,751 B2 | 5/2003 | Anderson et al. |
| 6,880,488 B1 | 4/2005 | Hall |
| 6,976,454 B2 | 12/2005 | Cattaruzzi |
| 2004/0050653 A1 | 3/2004 | Mola |

*Primary Examiner*—Thomas Price
(74) *Attorney, Agent, or Firm*—David D. Winters

(57) ABSTRACT

Machine for alternating conveyor belt livestock loading with pre-loader having conveyor belt, main conveyor section having lift section, top section, and conveyor belt, swing belt section having conveyor belt, and autoloader section having plurality of conveyor belts.

5 Claims, 3 Drawing Sheets

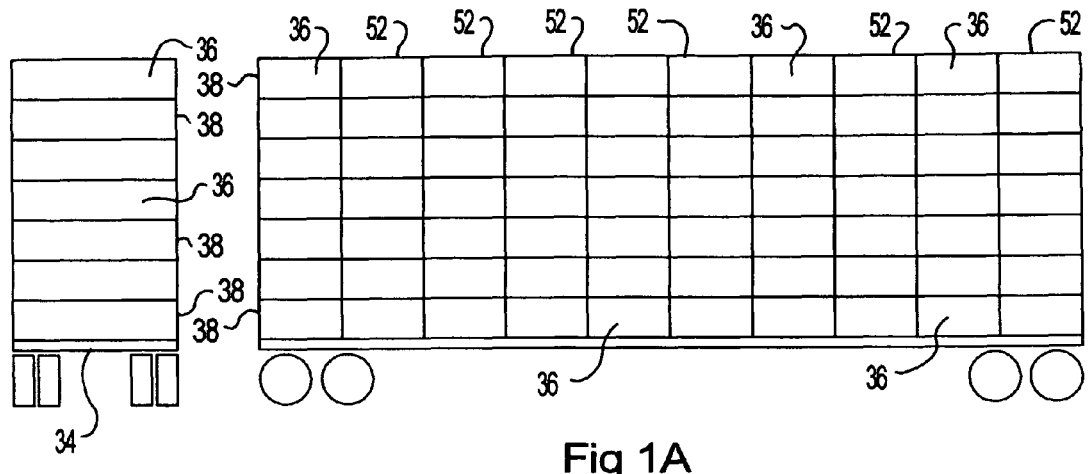
Fig 1
Fig 1A
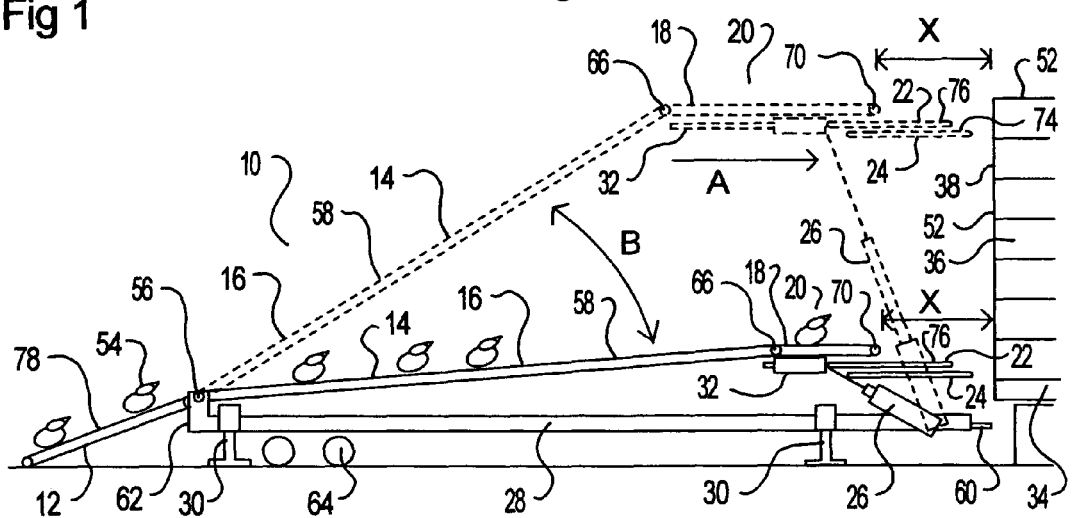
Fig 2

MACHINE FOR ALTERNATING CONVEYOR BELT LIVESTOCK LOADING

CROSS REFERENCE TO RELATED APPLICATIONS

Not Applicable

STATEMENT REGARDING FEDERALLY SPONSORED RESEARCH OR DEVELOPMENT

Not Applicable
Description of Attached Appendix
Not Applicable

BACKGROUND OF THE INVENTION

This invention relates generally to the field of livestock handling and more specifically to machine for alternating conveyor belt livestock loading.

As the production and processing of livestock, in particular poultry, has become centralized with hundreds if not thousands of animals raised and housed in one location and thousands, if not hundreds of thousands of animals processed in one centralized location, the need arose to efficiently transport large numbers of animals from point of origin to the processing plants or other locations. Therefore, customized vehicles able to contain the maximum number of animals and loading methods to load the maximum number of animals most quickly with the least amount of stress upon and aggravation of said animals have been devised.

At present, the most common transportation means, particularly for poultry, is a semi-trailer having cages or coops arranged side by side to form horizontal tiers and vertical columns. And the most efficient loading means is a device having a conveyor system having a plurality of different moving belts communicating with the ground, where animals may be herded thereonto, and the interior of a coop where the animals may be deposited thus filling said coop.

These devices generally have a main conveyor system which may be raised or lowered and which transfers animals to another loading conveyor belt which extends into the coop proximal the back of said coop. This loading conveyor belt moves animals into the coop and is progressively withdrawn as the coop is filled, at which time the coop is closed and the conveyor system is either lowered or raised to the next coop in the column and the process repeated.

When each coop in a column has been loaded, the trailer must be moved to align an empty column with the loader. This process is repeated until each column is filled.

The present state of the art is an improvement over the older methods which were labor intensive and usually involved a team of workmen who captured animals by hand and stuffed them into coops or passed them to others who did the loading. This caused much stress both upon workmen and animals and injuries to both were common. However, present methods still give occasion to disadvantages.

In example, when a coop is filled and the machine must be re-oriented to engage an empty coop and/or when a column of coops is full and the trailer must be moved, the main conveyor belt must be shut off. Thus the loading of an entire semi-trailer requires constant stopping and starting of the main conveyor belt. This causes excess wear and tear on the machine, excess energy consumption, and excess stress upon the animals being loaded. In addition, every time a column of coops is filled, the trailer must be moved.

In contrast to the present state of the art devices, the instant art comprises means to immediately load a coop disposed side by side in an adjacent column. Thus, the instant art cuts, by at least half, the number of times a trailer being loaded must be moved thereby lessening the time required to completely load said trailer. In additional contrast, the instant art is contrived so that as said instant art is re-oriented from communication with full coops to empty coops, the main conveyor belt may run substantially continuously.

Thus, the instant art reduces the time required to load a trailer and reduces the stress on animals being loaded thereby advancing the art of loading livestock onto trailers.

BRIEF SUMMARY OF THE INVENTION

The primary object of the invention is faster loading of livestock, especially poultry, into cages or coops arranged in columns and tiers on a semi-trailer.

Another object of the invention is loading of livestock by a series of conveyor belts with significantly less frequent shut down of the main conveyor belt.

Another object of the invention is to load livestock into cages or coops with minimum disturbance and stress upon said livestock.

A further object of the invention is the loading of livestock into cages or coops accomplished by delivering said livestock to alternating loading conveyor belts.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a machine for alternating conveyor belt livestock loading comprising: pre-loader having a conveyor belt, main conveyor section having a conveyor belt and having a lift section and a top section, a swing belt section having a conveyor belt, and an auto-loader section having a plurality of substantially side by side conveyor belts.

In accordance with a preferred embodiment of the invention, there is disclosed a process for alternating conveyor belt livestock loading comprising the steps of: herding livestock onto a pre-loader which transfers the livestock to a main conveyor section having a top section, which transfers the livestock to a swing loader section which transfers the livestock to one auto-loader section conveyor belt extendable or retractable then swings to transfer livestock to an alternate autoloader section, extendable or retractable, conveyor belt.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

LIST OF COMPONENTS

Figure 2A:
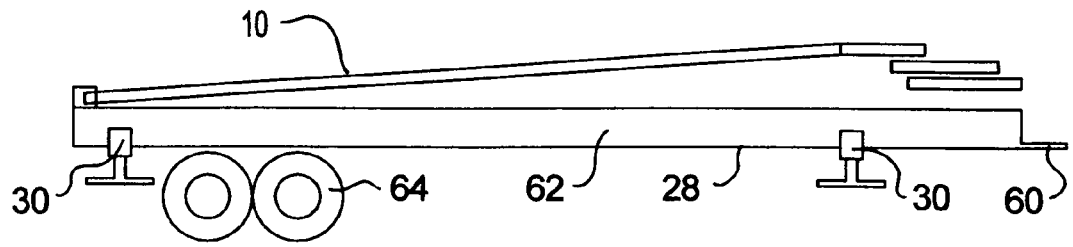

10 Loader
12 Pre-loader
14 Main conveyor section
16 Lift section
18 Top section
20 Major assembly
22 Swing belt section 24 Autoloader section
26 Lift cylinder
28 Trailer
30 Leveler
32 Extension cylinder
34 Semi-trailer
36 Coop
38 Tier
40 Take up section
42 Rollers
44 Weighted rollers
46 Weight
48 Belt slack
50 Extension cylinder
52 Column
54 Livestock (fowl)
56 Pivot point
58 Conveyor belt
60 Hitch
62 Trailer frame
64 Wheels
66 Main section pivot point
68 Ground
70 Top section end
72 Swing belt section end
74 Autoloader section conveyor belt
76 Swing belt section conveyor belt
78 Pre-loader conveyor belt
80 Swing belt section swivel
82 Swing belt section caster
84 Swing belt section track
Distance X
Direction A
Arc B

DESCRIPTION OF FIGURES

Figure 2B:
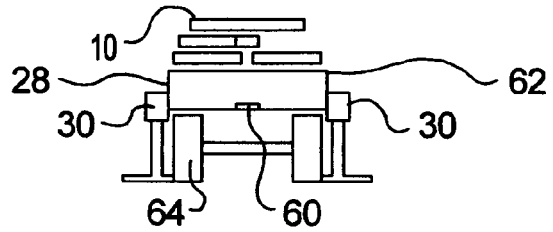
Figures 3, 3A:
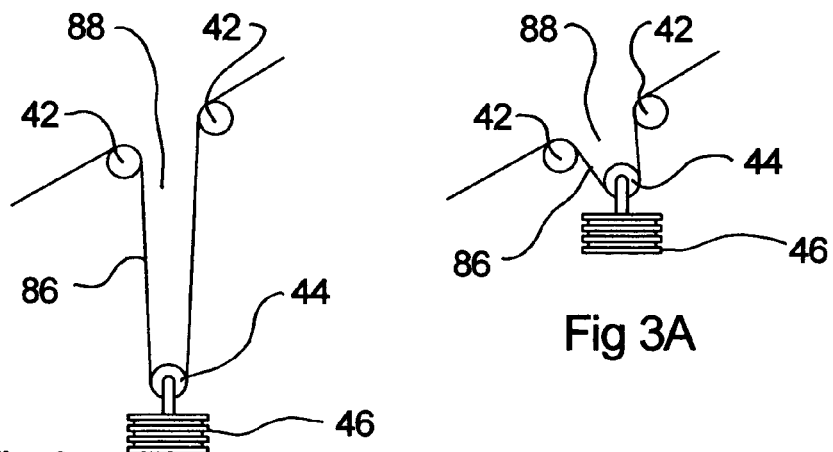
Figure 4:
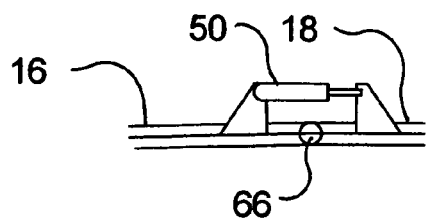
Figure 4A:
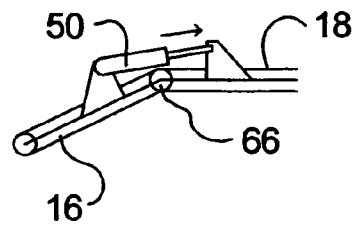
Figure 5:
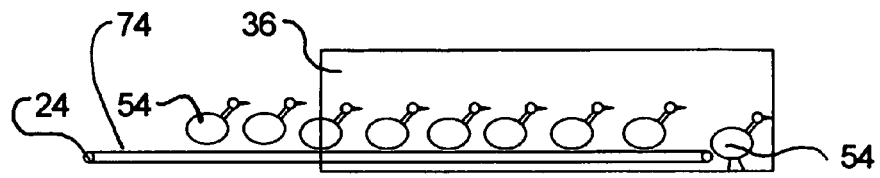
Figure 5A:
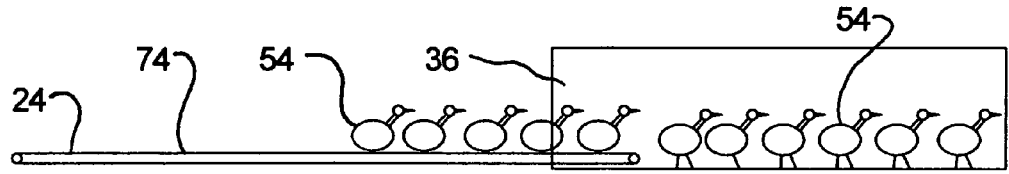
Figure 6:
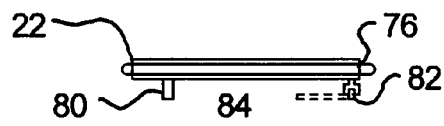
Figure 7:
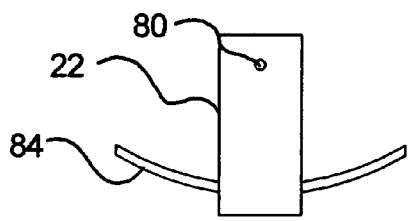
Figures 8, 8A:
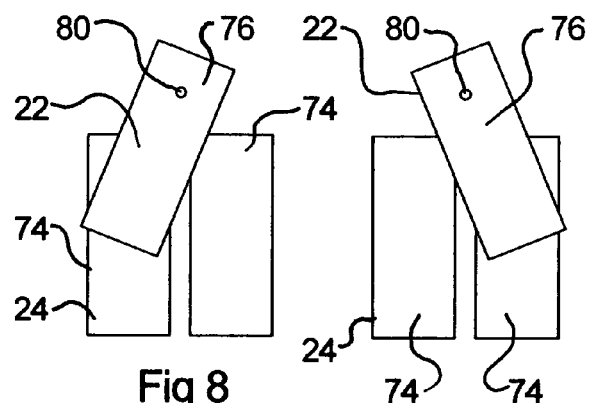
Figures 8B, 8C:
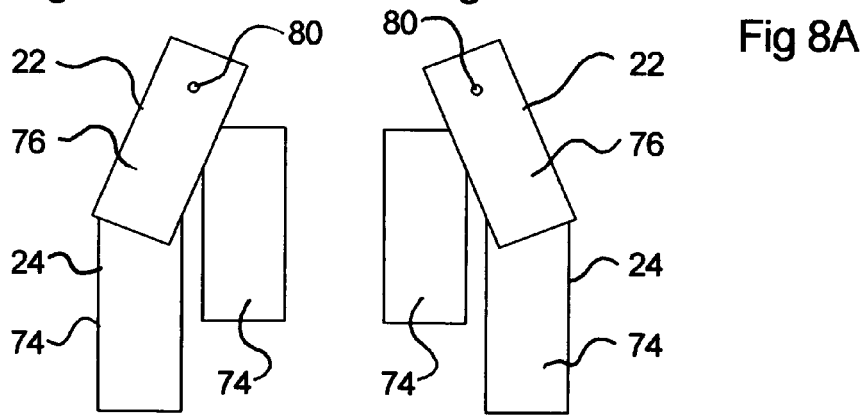

FIG. 1 is a back view of a semi-trailer.
FIG. 1A is a side view of a semi-trailer.
FIG. 2 is a view of the device and a semi-trailer.
FIG. 2A is a side view of the device.
FIG. 2B is a front view of the device.
FIG. 3 is a view of slack take up means.
FIG. 3A is a view of slack take up means.
FIG. 4 is a view of articulation means.
FIG. 4A is a view of articulation means.
FIG. 5 is a view of autoloader and coop.
FIG. 5A is a view of autoloader and coop.
FIG. 6 is a side view of a swing belt section.
FIG. 7 is a top view of a swing belt section.
FIG. 8 is a top view of swing belt section and autoloader.
FIG. 8A is a top view of swing belt section and autoloader.
FIG. 8B is a top view of swing belt section and autoloader.
FIG. 8C is a top view of swing belt section and autoloader.

DETAILED DESCRIPTION OF THE PREFERRED EMBODIMENT

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The instant art deals with sundry types of structures comprising sundry types and arrangements of conveyor belts and coordination of the speeds of some relative to others, all of which are well known in the art, therefore such structures, types and arrangements of conveyor belts, and methods of coordination of various conveyor belt elements will not be described in meticulous detail. Also, we may readily appreciate that automated livestock loaders may comprise elements having nothing to do with the inventive steps of the instant art, in example walls and or roof covers, which, for clarity, will therefore not be depicted nor described in great detail.

When used in reference to conveyor belts, the term "variable" may refer to length of conveyor belt, speed of conveyor belt, extension or retraction of conveyor belt and/or direction of travel of conveyor belt.

The terms "lift cylinder," "extension cylinder," and "leveling cylinder" are understood to refer to hydraulic or pneumatic cylinders having elements extendable or retractable to transfer force to and thusly cause movement of other structures. In addition, those well versed in the art will readily appreciate that other means of accomplishing the functions of hydraulic and/or pneumatic cylinders as applied in the instant art are known and may be exploited in the instant art. In example, elements extended by arrangements of racks and pinions, racks and worm gears, screw jacks, etc. are known.

Looking now at FIG. 1 and FIG. 1A we see a semi-trailer (34) especially adapted to transport livestock, in particular, poultry. Said trailer (34) has a plurality of coops (36) arranged side by side to comprise substantially horizontal tiers (38) stacked one on top of the other thusly comprising a plurality of substantially vertical columns (52). Now we may readily appreciate that said coops (36) may be of any type well known in the art and that said coops (36) may comprise entry doors that may be opened to allow loading and then closed after loading to confine livestock (54) therein. Further, said coops (36) may also comprise partitions which may be opened or closed to divide the coops (36) into discrete sections. In addition, we may readily appreciate that said coops (36) may be substantially permanently attached to the semi-trailer (34).

Turning now to FIG. 2, FIG. 2A, and FIG. 2B, we see a machine (10), for loading livestock (54), in particular poultry, into coops (36) attached to a semi-trailer (34) in the disposition previously described. Said machine (10) has a trailer (28) having a frame (62), a hitch (60), levelers (30), and wheels (64) so that said trailer may be moved from place to place and then oriented so that the loading machine (10) is in operative position, relative to a semi-trailer (34) comprising columns (52) and tiers (38) of coops (36) as previously described.

Looking further at FIG. 2, we see that the machine (10) also comprises a main conveyor section (14) having a conveyor belt (58). Also, we note that the main conveyor section (14) comprises a lift section (16) and a top section (18) with the conveyor belt (58) traversing the lift section (16) and the top section (18), said top section (18) oriented substantially horizontally, the lift section (16) and the top section (18) having a pivot point (66) there-between, so that the lift section (16) and the top section (18) may articulate each relative the other by means well known in the art. In example as in FIG. 4 and FIG. 4A where we note that the lift section (16) and the top section (18) may have a leveling cylinder (50) anchored therebetween so that extension or retraction of the extension cylinder (50) will cause the lift section (16) and the top section (18) to articulate each relative the other. Thus, the top section comprises the pivot point (66) and an end (70) opposite the pivot point (66). Further, we note that in operative position, the top section (18) is substantially level and the top section end (70) is at an optimal distance from the column of coops (52), distance X.

Turning yet again to FIG. 2, we see that the main conveyor section (14) communicates with the trailer (28) and trailer frame (62) at a pivot point (56) at the end of the main conveyor section (14) opposite the main conveyor section pivot point (66) and by means of a lift cylinder (26) attached to the trailer frame (62) and the main conveyor (14). In addition, we also see that the loader (10) comprises a major assembly (20) having the top section (18) of the main conveyor section (14), a swing belt section (22) having a conveyor belt (76), and an autoloader section (24) having at least one conveyor belt (74), said top section (18), swing belt section (22) and auto-loader section (24) being integral structures having conveyor belts (58, 76, 74) independently variable. Also, we note a pre-loader (12), an independent structure having a conveyor belt (78) independently variable relative other conveyor belts (58, 74, 72), communicating with the ground (68) and the end of the main conveyor section (14) proximal the pivot point (56). Further, we note that in operative position, the top section (18) is substantially level and the top section end (70) is at an optimal distance from the column of coops (52), which distance is distance X.

Attending again to FIG. 2, we see that the lift cylinder (26) may be extended causing the main conveyor section (14) to rise while pivoting about the pivot point (56) thusly describing an arc as indicated by double pointed arrow B, and we may readily appreciate that by retraction of the lift cylinder (26), the main conveyor (14) may be lowered along the same course indicated by double pointed arrow B.

Now we may readily appreciate that as the main conveyor section (14) is lifted and pivoted about pivot point (56) by lift cylinder (26) thusly describing the arc (B), the distance X from the top section end (70) to the column (52) of coops (36) will tend to increase and the orientation of the top section (18) will tend to vary from substantially horizontal. However, the top section (18) is extendable in direction A by extension cylinder (32) and the top section (18) is articulatable relative the lift section (16) by extension cylinder (50). Therefore, we may readily appreciate that by proper extension of, and articulation of, the top section (18), the top section (18) may be maintained in substantially horizontal position and the distance X from the top section end (70) to the column (52) of coops (36) may be kept substantially constant. In addition, we may readily appreciate that said coordination may be affected by well known control systems for cylinders (26, 32, 50). In example by systems comprising computers, servo mechanisms, control and feed back devices and circuitry, etc., or human operators or combinations of any of the above.

In addition, we may readily appreciate that as the main conveyor section (14) is lowered by retraction of lift cylinder (26), leveling cylinder (50) and extension cylinder (32) may be retracted in coordinated manner to maintain top section (18) in a substantially horizontal orientation and maintain distance X substantially constant by any of the same aforementioned means or combinations thereof.

Now, we may readily appreciate that the extension and/or retraction of the top section (18) of the main conveyor section requires means to take up or play out slack in the main conveyor section conveyor belt (58). Such means are well known. In example, as in FIG. 3 and FIG. 3A, we see that the main conveyor section (14) may comprise a gap (88) defined by rollers (42) over which the main conveyor belt (58) may travel, thusly extending a portion of said belt (58) through the gap (88) to comprise a slack loop (86) held taught by weight (46) and weighted roller (44). Therefore as the top section (18) is extended or retracted the slack loop (86) may increase in size or decrease in size as necessary.

Turning now to FIG. 5 and FIG. 5A, we see a coop (36) with an autoloader section (24) conveyor belt (74) extending thereinto. Upon the autoloader section conveyor belt (74) we note livestock (54), in particular fowl, and we may readily appreciate that the livestock (54) may be transported into the coop (36) as said livestock is cycled off the end of the auto-loader section (24) conveyor belt (74) by movement of the autoloader section (24) conveyor belt (74). Also, we may readily appreciate that as livestock (54) are deposited in the coop (36), the auto-loader section (24) conveyor belt (74) may be progressively withdrawn from the coop (36) and that the coop (36) may be thusly filled.

Turning back to FIG. 2, we may now readily appreciate that livestock (54), in example fowl, may be herded onto the pre-loader (12) and transported by conveyor belt (58) to the main conveyor (14) where it may then be moved up the lift section (16) to the top section (18) by conveyor belt (58). Movement of said conveyor belt (58) will then transport the animal off the end (70) of top section (18) and deposit said animal upon the swing belt section (22) whereupon movement of swing belt section conveyor belt (76) will move the animal (54) to a swing belt section conveyor belt end (72) and propel the animal (54) off the swing belt section conveyor belt end (72) and deposit the animal (54) onto the autoloader (24) whereupon it may be loaded into a coop (36) as previously described. Now we may readily appreciate that the working elements of the loader (10) are carefully contrived so that the movement of animals by conveyor belts and the transfers of animals from one conveyor to another and/or from a conveyor belt to the interior of a cage or coop (36) are achieved with a minimum pushing or shoving or application of other raw force upon the animals, said constrained treatment being well within humane limits.

Looking again at FIG. 2, we note that the major assembly (20) comprises the top section (18) from which depends the swing belt section (22) and the autoloader section (24) with the swing belt section (22) being disposed between the autoloader section (24) and the top section (18).

Turning to FIG. 6 and FIG. 7 we note that the swing belt section (22) comprises a swivel (80) and a caster (82) disposed in an arcuate track (84), the swivel (80) and the caster (82) being oriented proximal opposite ends of the swing belt section (22). Further, we see that the swing belt section has a conveyor belt (76).

Turning now to FIG. 7, FIG. 8, FIGS. 8A, 8B, and 8C we see that the auto-loader section (24) comprises a plurality of conveyor belts (74) disposed essentially side by side and that said conveyor belts (74) are independently extendable and/or retractable. In addition, we see that the swing belt section (22) may be swung about the swivel (80) while the track (84) guides and/or supports the swing belt section (22) as the swing belt section caster (82) engages said track (84). Thus, we may readily appreciate that the swing belt section end (72) may be disposed above alternately either one or another autoloader section conveyor belt (74).

Thus, we may readily appreciate that by loading one coop (36) by extension and retraction of one of the plurality of conveyor belts (74) as previously described and then swiveling the swing belt section (22) to communicate with the adjacent autoloader section conveyor belt (74) which in like manner may be extended into and withdrawn from the coop (36), coops (36) in adjacent columns (52) in the same tier (38) may be loaded as previously described without having to move the semi-trailer (34) upon which is loaded the said coops (36). Thereby, a portion of time taken by moving said semi-trailer (34) may be eliminated from the overall semi-trailer (34) loading process.

Turning yet again to FIG. 2, FIG. 5, FIG. 5a, FIG. 6, FIG. 7, FIG. 8, FIG. 8A, FIG. 8B, and FIG. 8C, we may readily appreciate that due to the previously described variability of the conveyor belts comprising the machine (10), a loading process may be achieved wherein the main conveyor section conveyor belt (58) may run substantially continuously. In example, during periods between off-loads, as when the swing belt section (22) is being swiveled, or the semi-trailer (34) is being moved, or the main conveyor section (14) is being raised or lowered to reorient the major assembly (20), and the autoloader section (24), to line up with empty coops (36), the main conveyor section conveyor belt (58) may continue to deposit livestock (54) upon the swing belt section (22), said section (22) having sufficient capacity so that by judicious manipulation of the speed of the swing belt section conveyor belt (76), no livestock are forced off the swing belt section end (72) until coop (36) loading may again commence.

Now we may readily appreciate that the sundry elements comprising the machine (10) may communicate with each other and/or be supported by various types of frameworks. Said framework types and dispositions are well known and are not claimed and therefore are not depicted in the figures or the descriptions for the sake of clarity and/or brevity. In addition, we may also readily appreciate that controls for the operation of the various elements of the machine (10) may be placed at any number of convenient locations about the machine (10) and that structures to house and/or support operators may be similarly disposed about the machine (10), many effective dispositions of said controls and operator housings being known. No such controls, housings, or dispositions are claimed; therefore, none are depicted in the figures nor described in detail. Further, we may readily appreciate that all elements of the machine (10) may be arranged on the trailer (28) so that all may be transported from place to place and the machine (10) taken down for transport at one location with minimum of time and effort and set up in operative position at another location with minimum of time and effort. Said dispositions of machinery are well known but none is claimed therefore none is depicted in the drawings nor described.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A machine for loading livestock via alternating conveyor belts, comprising:
    a main conveyor section comprising a conveyor belt, and having a lift section and a top section, the main conveyor section conveyor belt traversing the lift section and the top section,
        said lift section and top section articulatable each relative to the other,
        the top section being extendable and retractable, and the main conveyor section being raisable and lowerable;
    the machine also comprised of a major assembly comprising the top section, a swing belt section depending from and communicating with said top section, and an autoloader section depending from the swing belt section,
        such that the swing belt section is disposed between the top section and the autoloader section, and can communicate with both the said auto-loader section and the top section,
        and such that the top section, the swing belt section, and the auto-loader section comprise conveyor belts independent of one another and independently variable each relative to the other,
            the autoloader section comprising a plurality of independent, independently variable, conveyor belts, configured essentially side-by-side
            said auto-loader section conveyor belts being independently extendable and retractable,
            said swing belt section being pivotable to alternately communicate with any one or another of the plurality of autoloader section conveyor belts.

2. A machine as in claim 1 having a preloader not integral to any other element, said preloader comprising an independent and independently variable conveyor belt, said preloader able to communicate with the main conveyor section.

3. A machine as in claim 1 communicating with a trailer whereby said machine may be moved from place to place.

4. A machine for loading livestock via alternating conveyor belts, comprising:
    a main conveyor section comprising a conveyor belt, and having a lift section and a top section, the main conveyor section conveyor belt traversing the lift section and the top section,
        said lift section and top section articulatable each relative to the other,
        the top section being extendable and retractable, and the main conveyor section being raisable and lowerable;
    the machine also comprised of a major assembly comprising the top section, a swing belt section depending from and communicating with said top section, and an autoloader section depending from the swing belt section,
        such that the swing belt section is disposed between the top section and the autoloader section, and may communicate with both the said auto-loader section and the top section,
        and such that the top section, the swing belt section, and the auto-loader section comprise conveyor belts independent of one another and independently variable each relative to the other,
            the autoloader section comprising a plurality of independent, independently variable, conveyor belts, configured essentially side-by-side
            said auto-loader section conveyor belts being independently extendable and retractable,
    said swing belt section being pivotable to alternately communicate with
    any one or another of the plurality of autoloader section conveyor belts
    and also having a preloader not integral to any other element, said preloader comprising an independent and independently variable conveyor belt, said preloader able to communicate with the main conveyor section,
    the machine further communicating with a trailer whereby said machine may be moved from place to place.

5. A process for loading livestock on a transport vehicle via alternating conveyor belts, the transport vehicle comprising livestock containment structures arranged in horizontal tiers and vertical columns, comprising the steps of:
    by means of a machine comprising:
        a preloader having a conveyor belt,
        a main conveyor section having a lift section, a conveyor belt and a top section, a swing belt section having a conveyor belt,
and an autoloader section having a plurality of substantially side by side conveyor belts,
the top section, the swing belt section, and the autoloader section comprising a main assembly,
herding livestock onto the pre-loader and via the pre-loader, transporting and transferring the livestock to the main conveyor section,
said main conveyor section then transporting said livestock along the lift section to the top section of said main conveyor section,
said top section communicating with and transferring said livestock to the swing belt section,
said swing belt section communicating with and transferring said livestock to the autoloader section having a plurality of substantially side by side conveyor belts,
swinging the said swing belt section so as to communicate one of the plurality of the auto-loader section conveyor belts and transferring the livestock thereto,
extending the said autoloader section conveyor belt into a given structure to be loaded,
depositing the livestock therein,
withdrawing the said autoloader conveyor belt from the given structure as space within is filled with deposited livestock,
swinging the swing belt section to communicate with another of the plurality of auto-loader section conveyor belts, and recommencing loading process via the said other auto-loader section conveyor belt,
repeating steps until all animal containment structures communicable with all auto-loader section conveyor belts are full,
pausing this process for loading livestock,
reorienting major assembly to communicate with more empty animal containment structures,
resuming the process for loading livestock,
moving the transport vehicle to re-align the autoloader section with empty containment structures on the transport vehicle, when all containment structures communicable with the autoloader section are filled,
repeating the above steps until all the containment structures aboard the transport vehicle are filled.

* * * * *